United States Patent [19]
Kaneda et al.

[11] Patent Number: 5,483,377
[45] Date of Patent: Jan. 9, 1996

[54] DISPLACEMENT DETECTION APPARATUS

[75] Inventors: Yasushi Kaneda, Tokyo; Koh Ishizuka, Ohmiya; Hiroshi Kondo, Yokohama; Satoshi Ishii, Tokyo, all of Japan

[73] Assignee: Canon Kabushiki Kaisha, Tokyo, Japan

[21] Appl. No.: 169,402

[22] Filed: Dec. 20, 1993

[30] Foreign Application Priority Data

Dec. 24, 1992 [JP] Japan ..................... 4-344560

[51] Int. Cl.⁶ .................. G02B 5/18; G02B 27/44; H01J 3/14; H01J 40/14
[52] U.S. Cl. ............. 359/566; 250/237 G; 359/571
[58] Field of Search ................ 359/566, 569, 359/571; 250/237 G

[56] References Cited

U.S. PATENT DOCUMENTS

| | | | |
|---|---|---|---|
| 4,176,276 | 11/1979 | Kaul et al. | 250/237 |
| 4,766,310 | 8/1988 | Michel | 250/237 |
| 5,026,164 | 6/1991 | Ichikawa | 250/237 |
| 5,080,465 | 1/1992 | Laude | 359/571 |
| 5,101,102 | 3/1992 | Nishimura et al. | 250/231.16 |
| 5,113,067 | 5/1992 | Nakai et al. | 359/571 |
| 5,216,478 | 6/1993 | Kadowaki et al. | 356/28.5 |
| 5,221,835 | 6/1993 | Setani | 359/571 |
| 5,223,703 | 6/1993 | Setani | 359/571 |
| 5,283,434 | 2/1994 | Ishizuka et al. | 250/237 G |

FOREIGN PATENT DOCUMENTS

| | | |
|---|---|---|
| 0163362 | 12/1978 | European Pat. Off. . |
| 0223009 | 5/1987 | European Pat. Off. . |
| 0463561 | 1/1992 | European Pat. Off. . |
| 2653545 | 5/1978 | Germany . |
| 263362 | 12/1988 | Germany .............. 359/571 |
| 59-100404 | 6/1984 | Japan .................. 359/571 |
| 62-121314 | 6/1987 | Japan . |
| 1180615 | 12/1989 | Japan . |
| 2262064 | 10/1990 | Japan . |
| 2247313 | 2/1992 | United Kingdom . |
| WO86/03833 | 7/1986 | WIPO . |
| WO87/07944 | 12/1987 | WIPO . |

OTHER PUBLICATIONS

Jull et al, "Perfectly Blazed Triangular Groove Reflection Gratings", J. Op. Soc. Am. A., vol. 1, No. 2, Feb. 1984, pp. 180–182.

Gross et al, "Blazed Dielectric Gratings With High Beam-Coupling Efficiencies," *Applied Physics Letters*, vol. 36, No. 7, 1 Apr. 1980, pp. 523–525.

*Primary Examiner*—Martin Lerner
*Attorney, Agent, or Firm*—Fitzpatrick, Cella, Harper & Scinto

[57] ABSTRACT

A displacement detection apparatus comprises a light source 1, a first diffraction grating including a blazed grating for diffracting and splitting light from the light source to irradiate a 0-order diffraction light and a +1-order diffraction light to a second diffraction grating, a third diffraction grating including a blazed grating for combining a +1-order reflected diffraction light produced by the reflection and diffraction of the 0-order diffraction light by the second diffraction grating and a −1-order reflected diffraction light produced by the diffraction of the +1-order diffraction light by the second diffraction grating to produce an interference light, and a photo-sensing element for converting the interference light to a signal representing a change in the second diffraction grating.

15 Claims, 6 Drawing Sheets

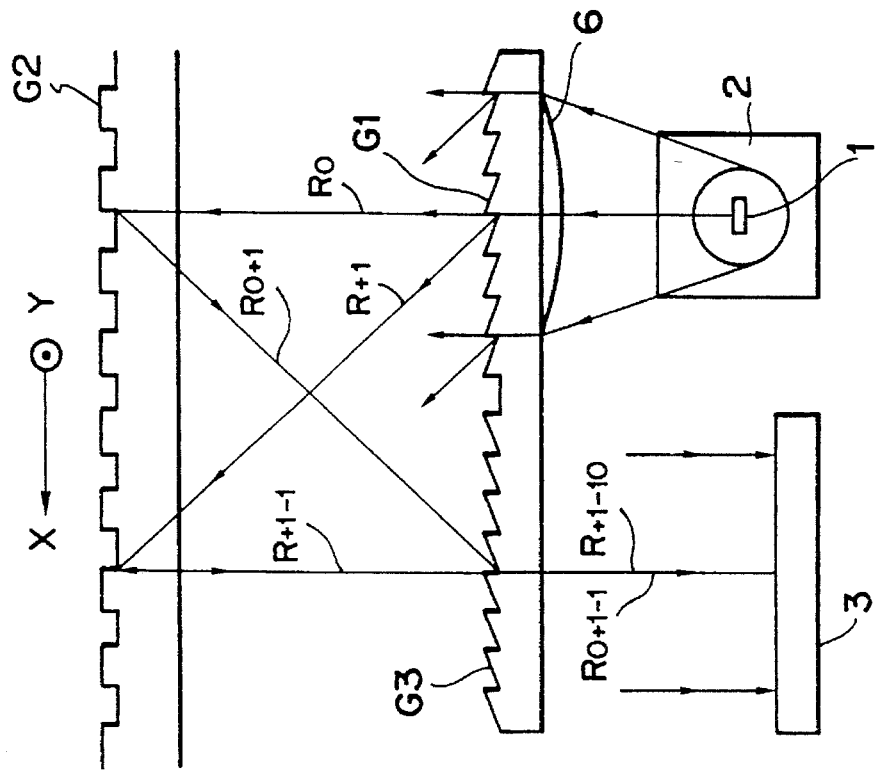
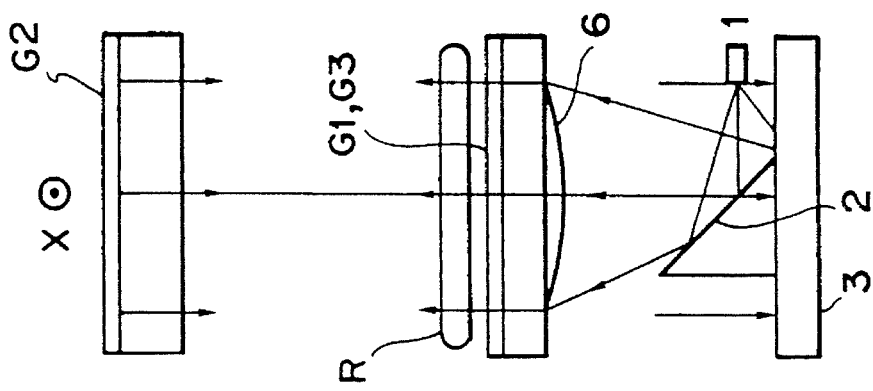

RELATIONSHIP BETWEEN DIFFRACTION
EFFICIENCY AND BLAZED ANGLE ; $\theta_b$

RELATIONSHIP BETWEEN DIFFRACTION EFFICIENCY AND BLAZED ANGLE, $\theta_b$

DISPLACEMENT DETECTION APPARATUS

BACKGROUND OF THE INVENTION

1. Field of the Invention

The present invention relates to an apparatus for optically detecting a displacement of an object (amount of movement, amount of rotation angle, velocity, acceleration), and more particularly to an encoder, a velocity sensor and an acceleration sensor and the like.

2. Related Background Art

An optical-type displacement sensor which irradiates light onto an object to obtain the displacement of the object with great precision such as an optical encoder, a laser doppler velocity sensor and a laser interfero-meter has widely been used in the fields of an NC machine tool, an OA equipment, a robot and a precision manufacturing equipment and the like.

In some such displacement sensors, a 0-order diffraction light and a 1-order diffraction light obtained by diffracting a laser beam with a first diffraction grating are irradiated onto a second diffraction grating which is formed on a scale, and a +1-order reflected diffraction light generating from the 0-order diffraction light generated by reflecting and diffracting 0-order diffraction light with a second diffraction grating and a −1-order reflected diffraction light generated by reflecting and diffracting the 1-order diffraction light with the second diffraction grating are directed to a third diffraction grating on the side of the first diffraction grating, and with the third diffraction grating the +1-order reflected diffraction light and the −1-order reflected light are combined to form an interference pattern, which is photoelectrically converted to produce a sine wave signal representing the displacement of the scale.

In the above displacement sensor, since each of the diffraction lights which form the interference pattern is subjected to diffraction and split operations a plurality of times by conventional diffraction gratings, the intensity of each diffracted light is small and as a result the intensity of the interference light is small. As a result, a problem has arisen that an S/N ratio of the sine wave signal produced by the photoelectric conversion is low.

A similar problem has resulted in other displacement sensors in which a diffraction grating is used.

SUMMARY OF THE INVENTION

A displacement detection apparatus of the present invention is directed to solving the above problems by using the blazed grating as a diffraction grating.

In accordance with one aspect of the present invention, the displacement detection apparatus comprises means for irradiating two light beams obtained by splitting a radiation beam incident on a diffraction grating, means for combining a first diffraction beam generated from said diffraction grating by the irradiation operation of one of the two light beams and a second diffraction beam generated by said diffraction beam by the irradiation of the other light beam, and means for receiving an interference beam formed by the combination operation of said first and second diffraction beams to convert the interference beam into a signal representing a displacement of said diffraction grating. Therein at least one of said irradiation means and said combination means has a blazed diffraction grating and said blazed diffraction grating at least performs either the operation for generating said two beams or the operation for combining said first and second diffraction beams.

In a preferred aspect, both said irradiation means and said combination means have blazed diffraction gratings. The blazed diffraction gratings in said irradiation means and said combination means are arranged along the same direction, and the blazed diffraction gratings in said irradiation means and said combination means are angled in opposite (symmetrical) sectional shapes with respect to a plane that is perpendicular to the plane upon which the gratings are formed.

In a preferred aspect, the following conditions are satisfied;

$$16M/\pi^4 \leq \sin^4\{F(\theta_b)\}/\{F(\theta_b)^2 G(\theta_b)^2\}$$

$$F(\theta_b) = \pi P(N-1) \tan(\theta_b)/\lambda$$

$$G(\theta_b) = \pi\{P(N-1)\tan(\theta_b)/\lambda - 1\}$$

where N is a refractive index of the blazed diffraction grating, P is a pitch thereof, $\lambda$ is a wavelength of the radiation beam, $\pi$ is a circular constant, and M is a permissible combined diffraction efficiency when a maximum of a combined diffraction efficiency of the 0-order diffraction light and the 1-order diffraction light generated by said blazed diffraction grating is set to be 1.

BRIEF DESCRIPTION OF THE DRAWINGS

FIGS. 2A and 2B illustrate the embodiment of FIG. 1, in which FIG. 2A shows a front view and FIG. 2B shows a side view;

DETAILED DESCRIPTION OF THE PREFERRED EMBODIMENTS

Figure 1:
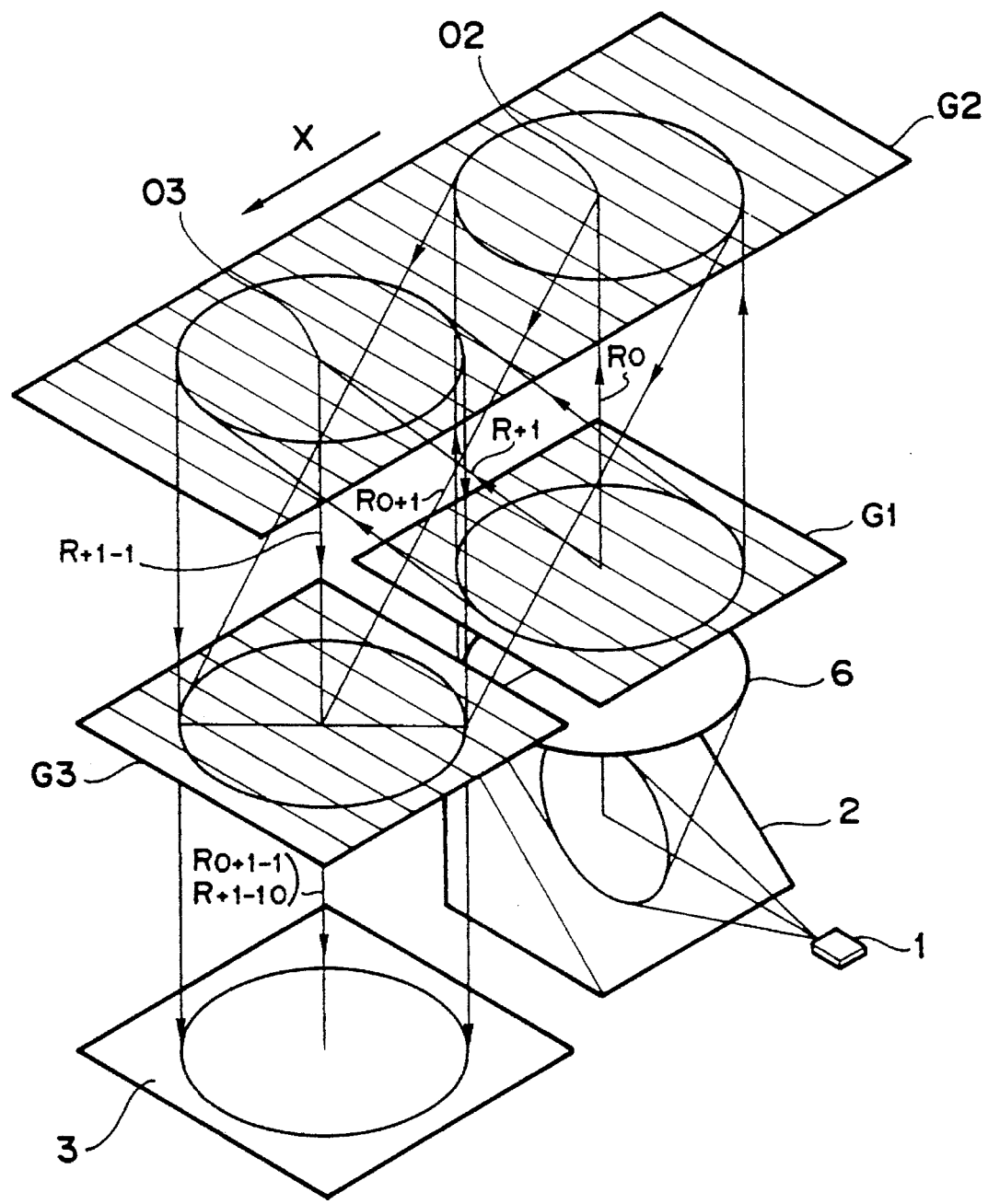
FIG. 1 shows an embodiment of the present invention.
Figure 3:
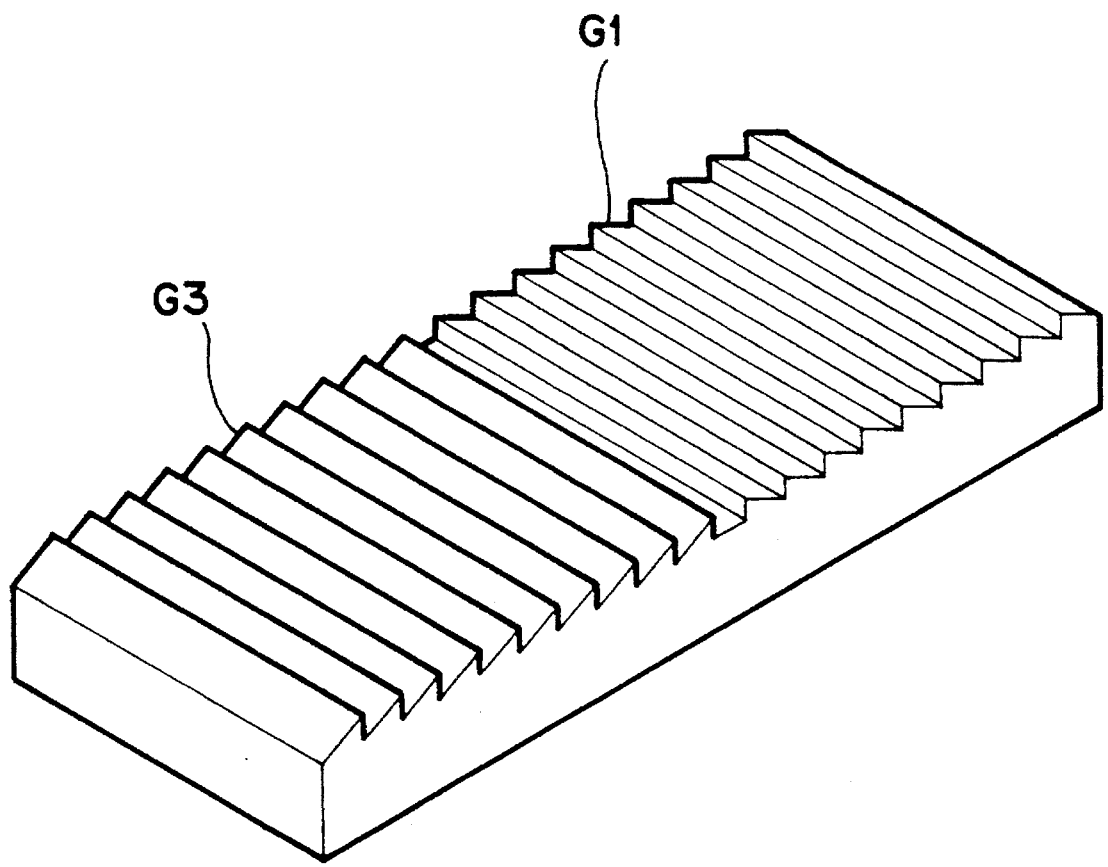
FIG. 3 shows a perspective view of a blazed diffraction grating used in the embodiment of FIG. 1.

FIG. 1 schematically shows an embodiment of the present invention, which forms an optical encoder. FIG. 2A shows a front view of the encoder of FIG. 1, FIG. 2B shows a side view of the encoder of FIG. 1, and FIG. 3 shows a blazed grating used in the encoder of FIG. 1.

Numeral 1 denotes a light emitting element such as an LED or a laser diode, numeral 2 denotes a folding mirror, and numeral 3 denotes a light receiving element such as a silicon photo-diode for photo-electric conversion. G1 denotes a blazed diffraction grating for splitting a light beam, which merely produces 0-order and +1-order diffraction lights or applies most portions of an incident light beam energy to the 0-order and +1-order diffraction lights. G2 denotes a diffraction grating which is a scale mounted on an object to be examined and is moved in a direction of an arrow X. G3 denotes a blazed diffraction grating for combining light beams, which has its blazing angle arranged symmetrically to the blazing angle of the blazed diffraction grating G1, for example as shown in FIG. 2a, to merely produce the 0-order and −1-order diffraction lights or apply most portions of the incident light beam energy to the 0-order and −1-order diffraction lights. Numeral 6 denotes a lens for forming a collimated light beam.

A light beam emitted from the light emitting element 1 is folded by the folding mirror 2 and converted to a proper collimated light beam R by a lens 6, and the light beam R is transmissive diffracted by the diffraction grating G1 and is diffracted by it.

A portion R0 (0-order diffraction light) of the light beam R passes through the diffraction grating G1 undeflected and is then diffracted at a point 02 on the reflective diffraction grating G2 formed on the scale. The light diffracted at point 02 is split into a +1-order reflected diffraction light R0+1 and a −1-order reflected diffraction light, which are subjected to phase modulation.

The +1-order reflected diffraction light R0+1 is incident on to the diffraction grating G3 with a phase shift of $+2\pi x/P$, where x is a displacement of the diffraction grating G2, and P is a pitch of the diffraction grating G2.

The +1-order diffraction light R0+1 is transmissive diffracted by the diffraction grating G3 and split to a 0-order diffraction light, a −1-order diffracted light R0+1−1 and the like. Of those, −1-order diffraction light R0+1−1 is emitted perpendicularly to the plane of the diffraction grating and is then incident on the light receiving element 3. The phase of the wave of the −1-order diffraction light R0+1−1 is $+2\pi x/P$.

The +1-order diffraction light R+1 from the diffraction grating G1 is diffracted at a point 03 on the reflective grating G2, and split to the −1-order diffraction light R+1−1, +1-order diffraction light and the like, which are subject to phase modulation. Of those, the −1-order reflected diffraction light R+1−1 is incident on the diffraction grating G3 with a phase shift of $-2\pi x/P$ and is then incident on the diffraction grating G3. The 0-order diffraction light R+1−10 of the diffraction light which passes through the diffraction grating G3 undeflected has wave phase of $-2\pi x/P$ and is incident on the light receiving element 3.

The light beams R+1−10 and R0+1−1 having their optical paths superimposed and combined by the diffraction grating G3 is converted to an interference light beam which is applied to the light receiving element 3. The interference phase thereof is given by;

$$\{+2\pi x/P\}-\{-2\pi x/P\}=4\pi x/P$$

and each time the diffraction grating G2 on the scale is moved by a ½ pitch relative to the diffraction gratings G1 and G3, a one period of dark-bright change appears in the interference light. As a result, the displacement of the object corresponding to an amount of movement of the scale (diffraction grating G2) is detected from the photoelectrically converted signal (sine wave signal) from the light receiving element 3.

In the present embodiment, since the blazed diffraction gratings G1 and G3 whose blazing angles are arranged symmetrically as shown in FIG. 3 are used, no extra diffraction light is produced. Consequently, the intensity of the interference light is increased and the intensity of the light incident on the photo-sensing element 3 is increased so that the contrast and the S/N ratio of the output signal are improved.

In the present embodiment, the interference optical system is very simple in its construction, and where the lens and the diffraction gratings G1 and G3 are formed on both sides of a glass plate by a replica manufacturing method or the like, a compact and inexpensive encoder can be produced.

In the present embodiment, since the 0-order and 1-order diffraction lights are combined to produce the interference light, the diffraction gratings which can make best use of diffraction light in which 0-order and first order are combined is required. The diffraction intensities $I_0$ and $I_1$ of the 0-order and 1-order light are calculated as follows assuming that the intensity of the incident light to the diffraction grating is set to be 1;

$$I_0=\{\sin\{F(\theta_b)\}/F(\theta_b)\}^2 \quad F(\theta_b)=\pi P(N-1)\tan[\theta_b]/\lambda \quad I_1=\{\sin\{G(\theta_b)\}/G(\theta_b)\}^2 \quad G(\theta_b)=\pi[P(N-1)\tan\{\theta_b\}/\lambda-1]$$

where P is the pitch of the grating, N is the refractive index of the grating, $\theta_b$ is the blazed angle of the grating, $\lambda$ is the wavelength of the incident light, and $\pi$ is the circular constant. Since the intensity of the incident light is assumed to be 1, the intensities $I_0$, $I_1$ and $I_{01}$ of the diffraction lights may be considered as diffraction efficiencies. Since the combined diffraction efficiency of the 0-order and 1-order diffraction lights is given by the product of $I_0$ and $I_1$, $I_{01}$ is given as follows from the above formula;

$$I_{01}=\sin^4\{F(\theta_b)\}/\{F(\theta_b)^2 G(\theta_b)^2\}$$

From the above formula, a blazed angle $\theta_b$ at a maximum combined diffraction efficiency is given by;

$$\theta_{max}=\tan^{-1}[\lambda/\{2P(N-1)\}]$$

and a maximum combined light diffraction efficiency $I_{01max}$ is given by;

$$I_{01max}=16/(\pi^4)$$

It is assumed that the 0-order/1-order combined diffraction efficiency $I_{01}$ is a function of the blazed angle $\theta_b$, and a permissible diffraction efficiency of the 0-order/1-order combined diffraction efficiency $I_{01}$ when the blazed angle $\theta_b$ is changed is set to be M (M=any value from zero to one, the utilization efficiency is maximum when M=1). A condition for $\theta_b$ in which the combined diffraction efficiency exceeds a desired permissible diffraction efficiency M is given by the following condition formula;

$$16M/\pi^4 \leq \sin^4\{F(\theta_b)\}/\{F(\theta_b)^2 G(\theta_b)^2\}$$

$$F(\theta_b)=\pi P(N-1)\tan(\theta_b)/\lambda$$

$$G(\theta_b)=\pi\{P(N-1)\tan(\theta_b)/\lambda-1\}$$

Figure 4:
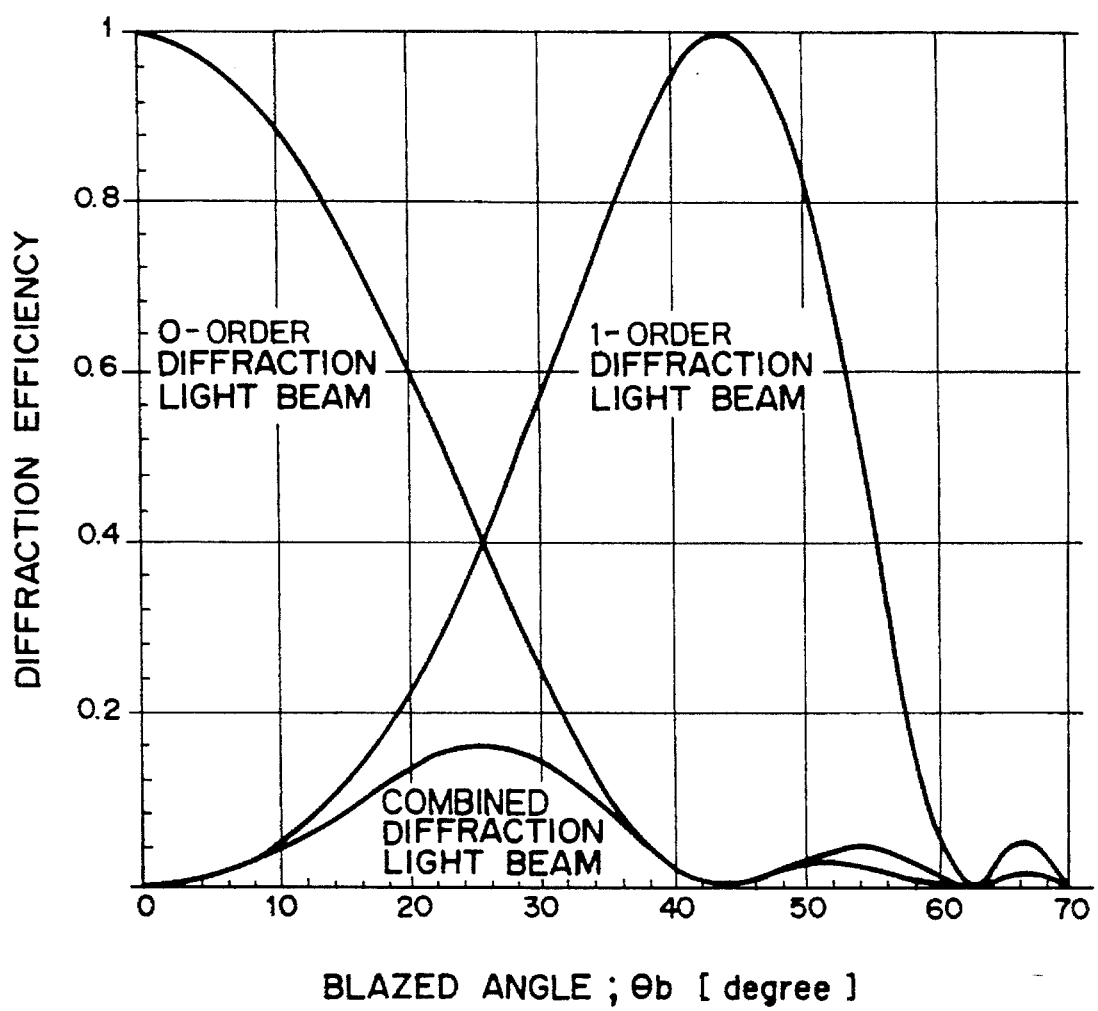
FIG. 4 shows a graph of a diffraction efficiency of the blazed diffraction grating.
Figure 5:
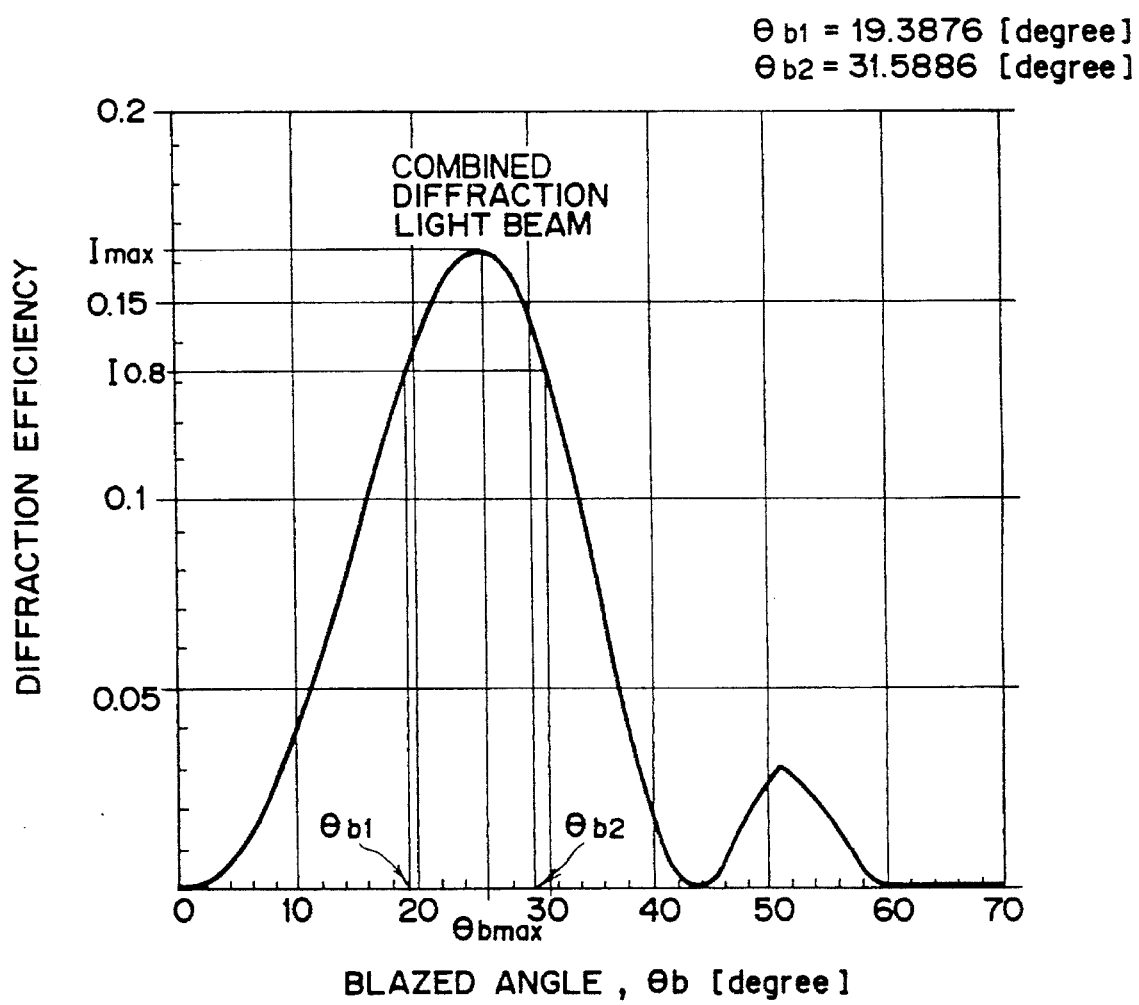
FIG. 5 shows another graph of the diffraction light factor of the blazed diffraction grating.
Figure 6:
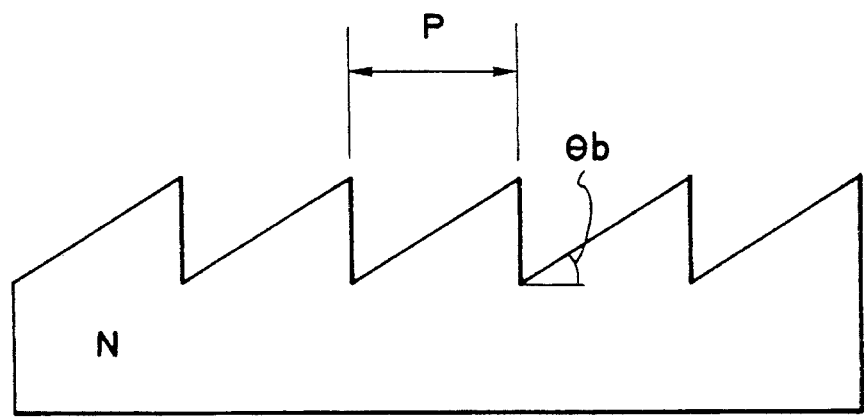
FIG. 6 illustrates the blazed diffraction grating.

When $\lambda$=785 nm, P=1.6 μm and N=1.50746, a relation between the blazed angle $\theta_b$ of the blazed grating and the 0-order light and 1-order light and the combined diffraction efficiency of the 0-order light and 1-order light is shown in FIG. 4. FIG. 5 shows only the combined diffraction efficiency in an enlarged scale. $I_{max}$ is the maximum combined diffraction efficiency and $\theta_{bmax}$ is the blazed angle therefore. $I_{0.8}$ indicates a diffraction efficiency when the combined diffraction efficiency of 0-order light is 80% of the maximum value, and $\theta_{b1}$ and $\theta_{b2}$ are blazed angles therefore. Where a preferable condition of the 0-order light and 80% or more than 80% of the maximum combined diffraction efficiency is desired, M=0.8. From the above condition, a grating having the blazed angle in the range of $\theta_{b1} \leq \theta_b \leq \theta_{b2}$ may be manufactured so that the light intensity of more than 80% of that for the maximum combined diffraction efficiency is attained. In the present example, the range of the blazed angle $\theta_b$ is;

$$19.3876° \leq \theta_b \leq 31.5886°$$

It has been proved that the value of M is preferably M≅0.6, and more preferably M≅0.8. By manufacturing the grating such that the blazed diffraction gratings G1 and G3 have the blazed angles which satisfy the above condition, no extra diffraction light is produced and the desired 0-order light and 1-order diffraction light can be efficiently utilized. As a result, the light intensity applied to the photo-electric element (light receiving element) 3 is increased and the displacement detection signal (sine wave signal) having a stable and high S/N ratio can be obtained.

The present embodiment is very simple in the construction of the interference optical system and with a replica production method or the like a compact and inexpensive encoder may be attained by forming the lens and the diffraction gratings G1 and G3 on both sides of the glass plate surfaces.

In the present embodiment, two diffraction gratings for splitting the light beam and combining the light beam are mutually symmetrical although only one of the two diffraction gratings may be a blazed grating to attain a similar effect. Further, only one of the light beam splitter and the light beam combiner is also effected by using it as a blazed grating. The diffraction grating G2 may be a blazed grating. The two blazed diffraction gratings for splitting light beam and combining light beam may not be mutually symmetric (in term of sectional shape).

Figure 7:
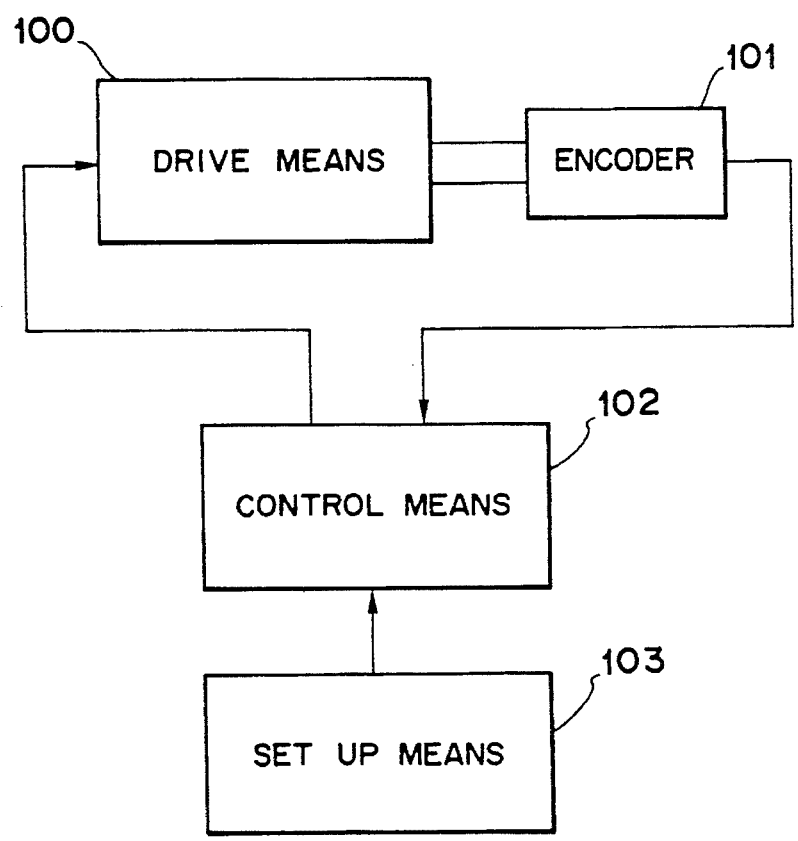
FIG. 7 shows a block diagram of an embodiment of a drive system having the displacement detection apparatus of the present invention.

FIG. 7 shows an embodiment in which the above-mentioned present invention is applied to an encoder. It shows a system configuration of a drive system which uses the encoder. An encoder 101 is provided with a drive output unit of drive means 100 having a drive source such as a motor, an actuator or an engine, or a movable portion of a driven article to detect a displacement status such as a distance of movement or a displacement velocity. One of the above embodiments is used as the encoder. A detection output of the encoder 101 is fed back to control means 102 which transmits a drive signal to the drive means 100 to set it as set by setting means 103. By such a feedback system, the drive condition set by the setting means 103 can be obtained. Such a drive system may be widely applied to an office equipment such as a typewriter, a printer, a copy machine or a facsimile machine, an image equipment such as a camera or a video apparatus, and an information recording and reproducing apparatus, a robot, a machine tool, a manufacturing equipment, a transport machine and any other apparatus having a drive means.

What is claimed is:

1. A displacement detection apparatus comprising:
  means for irradiating two light beams obtained by splitting a radiation light beam directed to a diffraction grating;
  means for combining a first diffraction light beam generated from said diffraction grating by irradiating one of the light beams and a second diffraction beam generated from said diffraction grating by irradiating the other light beam; and
  means for receiving an interference light beam formed by the combination of said first and second diffraction beams to convert it into a signal representing information of the displacement of said diffraction grating;
  wherein each of said irradiating means and said combining means has a blazed diffracting grating, and wherein each of said blazed diffraction gratings of said irradiating means and said combining means has blaze angles that are reversed with respect to a line perpendicular to both of said blazed diffraction gratings.

2. A displacement detection apparatus according to claim 1, wherein said first diffraction light beam includes a +m-order diffraction light and said second diffraction beam includes a −m-order diffraction light (where m is a natural number).

3. A displacement detection apparatus according to claim 2, wherein one of said two light beams includes a 0-order diffraction beam and the other includes a 1-order diffraction beam.

4. A drive system having a displacement detection apparatus according to claim 3.

5. A displacement detection apparatus according to claim 2, wherein said first diffraction light beam is a +1-order diffraction light beam and said second diffraction light beam is a −1-order diffraction light beam.

6. A drive system having a displacement detection apparatus according to claim 5.

7. A drive system having a displacement detection apparatus according to claim 2.

8. A drive system having a displacement detection apparatus according to claim 1.

9. A displacement detection apparatus comprising:
  means for irradiating two light beams obtained by splitting a radiation light beam to a diffraction grating;
  means for combining a first diffraction light beam generated from said diffraction grating by irradiating one of the light beams and a second diffraction beam generated from said diffraction grating by irradiating the other light beam; and
  means for receiving an interference light beam formed by the combination of said first and second diffraction beams to convert it into a signal representing information of the displacement of said diffraction grating;
  wherein each of said irradiating means and said combining means has a blazed diffraction grating, and said blazed diffraction gratings of said irradiating means and said combining means each have blaze angles that are reversed with respect to a line perpendicular to both of said blazed diffraction gratings,
  wherein said first diffraction light beam includes a +m-order diffraction light and said second diffraction beam includes a −m-order diffraction light, where m is a natural number;
  wherein one of said two light beams includes a 0-order diffraction beam and the other includes a 1-order diffraction beam;
  wherein both said irradiating means and said combining means have a blazed diffraction grating; and
  wherein the following conditions are satisfied:

$16M/\pi^4 \leq \sin^4\{F(\theta_b)\}/\{F(\theta_b)^2 G(\theta_b)^2\}$ $F(\theta_b) = \pi P(N-1) \tan(\theta_b)/\lambda\{-1\}$ $G(\theta_b) = \pi\{P(N-1) \tan(\theta_b)/\lambda - 1\}$ where N is a refractive index of said blazed diffraction grating, P is a pitch thereof, λ is a wavelength of said radiation light beam, π is a circular constant, and M is a permissible combined diffraction efficiency when a maximum of a combined diffraction efficiency of the 0-order diffraction light and the 1-order diffraction light generated by said blazed diffraction grating is set to be 1.

10. A displacement detection apparatus according to claim 9, wherein M=0.6.

11. A drive system having a displacement detection apparatus according to claim 10.

12. A displacement detection apparatus according to claim 9, wherein M=0.8.

13. A drive system having a displacement detection apparatus according to claim 12.

14. A drive system having a displacement detection apparatus according to claim 9.

15. A displacement detection apparatus for detecting displacement information relative to a diffraction grating comprising:

two blazed diffraction gratings, the first of said two blazed diffraction gratings being used to generate two split beams for irradiating said diffraction grating, the second of said two blazed diffraction gratings being arranged to combine two diffracted beams emitted from said diffraction grating by irradiating the said split beams; and a photodetecting device for detecting the two diffracted beams combined by said second blazed diffraction gratings and for generating a detection signal representing information of the relative displacement.

* * * * *

UNITED STATES PATENT AND TRADEMARK OFFICE
CERTIFICATE OF CORRECTION

PATENT NO. : 5,483,377  
DATED : January 9, 1996  
INVENTOR(S) : Kaneda et al.

It is certified that error appears in the above-indentified patent and that said Letters Patent is hereby corrected as shown below:

Title page, item  
[56] References Cited: col. 2, line 3,

FOREIGN PATENT DOCUMENTS

"263362  12/1988  Germany ... 359/571" should read  
--263362  12/1988  German Democratic Republic ... 359/571--.  
"1180615  12/1989  Japan  
2262064  10/1990  Japan" should read  
--1-180615  12/1989  Japan  
2-262064  10/1990  Japan--.

COLUMN 1:

Line 15, "interfero-meter" should read --interferometer--; and  
Line 41, "arised" should read --arisen--.

COLUMN 3,

Line 7, "transmissive diffracted by the" should read --diffracted by the transmissive--;  
Line 18, "to" should be deleted;  
Line 21, "transmissive" should be deleted; and  
Line 22, "diffraction" should read --transmissive diffraction--.

UNITED STATES PATENT AND TRADEMARK OFFICE
CERTIFICATE OF CORRECTION

PATENT NO. : 5,483,377

DATED : January 9, 1996

INVENTOR(S) : Kaneda et al.

It is certified that error appears in the above-indentified patent and that said Letters Patent is hereby corrected as shown below:

<u>COLUMN 4</u>:

Line 27, "$\theta_{max}$" should read --$\theta_{bmax}$--.

Signed and Sealed this

Fourth Day of June, 1996

Attest:

BRUCE LEHMAN

Attesting Officer     Commissioner of Patents and Trademarks